(12) United States Patent
Bisceglia

(10) Patent No.: US 7,703,070 B2
(45) Date of Patent: Apr. 20, 2010

(54) METHOD AND SYSTEM FOR ASSESSING A SOFTWARE GENERATION ENVIRONMENT

(75) Inventor: John F. Bisceglia, Fairfield, CT (US)

(73) Assignee: International Business Machines Corporation, Armonk, NY (US)

(*) Notice: Subject to any disclaimer, the term of this patent is extended or adjusted under 35 U.S.C. 154(b) by 1232 days.

(21) Appl. No.: 10/426,150

(22) Filed: Apr. 29, 2003

(65) Prior Publication Data

US 2004/0230551 A1    Nov. 18, 2004

(51) Int. Cl.
G06F 9/44    (2006.01)
(52) U.S. Cl. .................................................. 717/101
(58) Field of Classification Search ................. 717/101, 717/102, 108, 120; 705/1, 400, 7–10, 12; 709/223; 715/733, 853; 707/102, 201; 704/270; 434/323
See application file for complete search history.

(56) References Cited

U.S. PATENT DOCUMENTS

| | | | | |
|---|---|---|---|---|
| 6,249,769 | B1 * | 6/2001 | Ruffin et al. | 705/7 |
| 6,260,020 | B1 * | 7/2001 | Ruffin et al. | 705/1 |
| 6,285,971 | B1 | 9/2001 | Shah et al. | |
| 6,442,748 | B1 | 8/2002 | Bowman-Amuah | |
| 6,453,269 | B1 | 9/2002 | Quernemoen | |
| 7,035,809 | B2 * | 4/2006 | Miller et al. | 705/8 |
| 7,096,188 | B1 * | 8/2006 | Schlick et al. | 705/7 |
| 7,139,999 | B2 * | 11/2006 | Bowman-Amuah | 717/101 |
| 2002/0049571 | A1 | 4/2002 | Verma et al. | |
| 2002/0059093 | A1 | 5/2002 | Barton et al. | |
| 2002/0069102 | A1 | 6/2002 | Vellante et al. | |
| 2002/0069207 | A1 * | 6/2002 | Alexander et al. | 707/102 |
| 2002/0095305 | A1 | 7/2002 | Gakidis et al. | |
| 2002/0107823 | A1 | 8/2002 | Lefebvre et al. | |
| 2002/0137015 | A1 * | 9/2002 | Guinta et al. | 434/323 |
| 2002/0143602 | A1 | 10/2002 | Chappel et al. | |
| 2002/0143606 | A1 | 10/2002 | Atefi et al. | |
| 2003/0018519 | A1 | 1/2003 | Balz et al. | |
| 2003/0055718 | A1 * | 3/2003 | Cimini et al. | 705/11 |
| 2003/0163357 | A1 * | 8/2003 | Engleman et al. | 705/7 |
| 2003/0190592 | A1 * | 10/2003 | Bruno et al. | 434/322 |
| 2003/0200137 | A1 * | 10/2003 | Drummond | 705/12 |

(Continued)

OTHER PUBLICATIONS

J.M.Gilchrist,"Project evaluation using the SEI method", Software Quality Journal 1, 1992, Chapman & Hall, pp. 37-44.*

(Continued)

*Primary Examiner*—Tuan Anh Vu
(74) *Attorney, Agent, or Firm*—Schmeiser, Olsen & Watts; William E. Schiesser

(57) ABSTRACT

A method and system for assessing a software generation environment (SGE). The SGE has a plurality of SGE characteristics. At least one query is generated for each SGE characteristic. Each query has a plurality of response choices and each response choice has a numerical score. A selected response choice is received for each query. A SGE score is computed and displayed for each SGE characteristic. The SGE score for each SGE characteristic is equal to a summation of the numerical scores associated with the selected response choices for the SGE characteristic. A total score is computed and displayed, wherein the total score is equal to a summation of the SGE scores.

9 Claims, 10 Drawing Sheets

U.S. PATENT DOCUMENTS

| | | | |
|---|---|---|---|
| 2004/0015377 A1* | 1/2004 | Hostetler | 705/7 |
| 2004/0059709 A1* | 3/2004 | Farrands et al. | 707/1 |
| 2004/0093261 A1* | 5/2004 | Jain et al. | 705/10 |
| 2004/0098265 A1* | 5/2004 | Kelly et al. | 704/270 |
| 2004/0204972 A1* | 10/2004 | Anant et al. | 705/7 |
| 2004/0243459 A1* | 12/2004 | Geritz et al. | 705/10 |

OTHER PUBLICATIONS

ISB, 'Information Technology Planning and Assessment Guidelines', May 20, 1999, pp. 1-30—http://isb.wa.gov/policies.aspx.*

McLaren, RW, Hardware Simulation Test Effectiveness Measurement Via Functional Path Analysis, TDB 10-86 p. 2001-2003., 1 page.

* cited by examiner

| Characteristics of Software Generation Environment (SGE) | Points Range For SGE Score | Rating For SGE Score | |
|---|---|---|---|
| 1. Production Environment Architecture | 0 to 20 points | Ad Hoc<br>Defined<br>Managed<br>Integrated<br>Optimized | 0 to 4 points<br>5 to 8 points<br>9 to 12 points<br>13 to 16 points<br>17 to 20 points |
| 2. Deployment Process | 0 to 20 points | Ad Hoc<br>Defined<br>Managed<br>Integrated<br>Optimized | 0 to 4 points<br>5 to 8 points<br>9 to 12 points<br>13 to 16 points<br>17 to 20 points |
| 3. Development Standards | 0 to 20 points | Ad Hoc<br>Defined<br>Managed<br>Integrated<br>Optimized | 0 to 4 points<br>5 to 8 points<br>9 to 12 points<br>13 to 16 points<br>17 to 20 points |
| 4. Development Environment | 0 to 20 points | Ad Hoc<br>Defined<br>Managed<br>Integrated<br>Optimized | 0 to 4 points<br>5 to 8 points<br>9 to 12 points<br>13 to 16 points<br>17 to 20 points |
| 5. Test Process | 0 to 20 points | Ad Hoc<br>Defined<br>Managed<br>Integrated<br>Optimized | 0 to 4 points<br>5 to 8 points<br>9 to 12 points<br>13 to 16 points<br>17 to 20 points |
| 6. Asset Reuse | -15 to 0 points | Ad Hoc<br>Defined<br>Managed<br>Integrated<br>Optimized | -13 to -15 points<br>-9 to -12 points<br>-6 to -8 points<br>-3 to -5 points<br>0 to -2 points |
| 7. Integration and Automation | -15 to 0 points | Ad Hoc<br>Defined<br>Managed<br>Integrated<br>Optimized | -13 to -15 points<br>-9 to -12 points<br>-6 to -8 points<br>-3 to -5 points<br>0 to -2 points |

*FIG. 2*

| Rating | Total Score |
|---|---|
| Ad Hoc | < 30 points |
| Defined | 30 to < 50 points |
| Managed | 50 to < 70 points |
| Integrated | 70 to 90 points |
| Optimized | > 90 points |

*FIG. 3*

LEGEND
PE: PRODUCTION ENVIRONMENT ARCHITECTURE
DS: DEVELOPMENT STANDARDS
TP: TEST PROCESS
IA: INTEGRATION & AUTOMATION
DP: DEPLOYMENT PROCESS
DE: DEVELOPMENT ENVIRONMENT
AR: ASSET REUSE

| Queries Relating To: Production Environment Architecture |
|---|
| 1. Is there a standard production environment in place? |
| 2. Who defines the production environment? |
| 3. Are the production environment standards documented? |
| 4. How is production environment change managed? |
| 5. How often do unscheduled changes occur in the production environment? |
| 6. Is an upgrade "roadmap" documented? |
| 7. Is there an escalation process in place? |
| 8. What percentage of applications requires exceptions? |

*FIG. 5*

| Queries Relating To: Deployment Process |
|---|
| 1. Is there a standard deployment process in place? |
| 2. Who manages the deployment process? |
| 3. Is the deployment process documented? |
| 4. How is change managed within the deployment process? |
| 5. Is there an escalation process in place? |
| 6. What percent of applications require exceptions? |

*FIG. 6*

| Queries Relating To: Development Standards |
|---|
| 1. Is there a standard development process in place? |
| 2. Who defines the development standards? |
| 3. Are the Development Standards documented? |
| 4. How is development standards change managed? |
| 5. How often do changes occur in the development standards? |
| 6. Are formal architecture reviews required? |
| 7. Is there an escalation process in place? |
| 8. What percent of applications require exceptions? |

*FIG. 7*

| Queries Relating To: Development Environment |
|---|
| 1. Is there a standard development environment in place? |
| 2. Does the development environment "mirror" the production environment? |
| 3. How is the development environment managed? |
| 4. Is there a development environment to support the production upgrade "roadmap"? |
| 5. Is there an escalation process in place? |
| 6. What percent of applications require exceptions? |

*FIG. 8*

| Queries Relating To: Test Process |
|---|
| 1. Is there a dedicated test environment in place? |
| 2. Does the test environment "mirror" the production environment? |
| 3. How is the test environment managed? |
| 4. Is there a test environment to support the production upgrade "roadmap"? |
| 5. Is there an escalation process in place? |
| 6. What percent of applications require exceptions? |

*FIG. 9*

| Queries Relating To: Asset Reuse |
|---|
| 1. Is there an asset reuse policy in place? |
| 2. Are individual assets certified to meet development and production standards? |
| 3. Does the asset reuse policy encourage contribution? |
| 4. Does the asset reuse policy encourage reuse? |
| 5. How are reuse-based savings measured? |

*FIG. 10*

| Queries Relating To: Integration and Automation |
|---|
| 1. How are changes between production architecture and development standards managed? |
| 2. How are changes between production, development and test environments managed? |
| 3. How is problem reporting managed? |
| 4. How is system monitoring managed? |

*FIG. 11*

PRODUCTION ENVIRONMENT ARCHITECTURE PANEL  40

| | QUESTIONS | ASSESSMENT | SCORE |
|---|---|---|---|
| | IS THERE A STANDARD PRODUCTION ENVIRONMENT IN PLACE? | ○ NO<br>○ PARTIAL<br>○ YES | 0 |
| | WHO DEFINES THE PRODUCTION ENVIRONMENT? | ○ INDIVIDUAL APPLICATIONS<br>○ CUSTOMER/END USER ORGANIZATION<br>○ CIO/CTO STRATEGY | 0 |
| | ARE THE PRODUCTION ENVIRONMENT STANDARDS DOCUMENTED? | ○ NO<br>○ YES, OUT OF DATE<br>○ YES, CURRENT | 0 |
| | HOW IS PRODUCTION ENVIRONMENT CHANGE MANAGED? | ○ AD HOC, NO CHANGE CONTROL<br>○ MANUAL CHANGE CONTROL<br>○ AUTOMATIC CHANGE CONTROL | 0 |
| 53<br>54 | HOW OFTEN DO UNSCHEDULED CHANGES OCCUR IN THE PRODUCTION ENVIRONMENT? | ○ WEEKLY<br>○ MONTHLY<br>○ QUARTERLY<br>○ YEARLY<br>○ NEVER | 0 |
| | IS AN UPGRADE "ROADMAP" DOCUMENTED? | ○ NO<br>○ YES, PRODUCT NAMES<br>○ YES, PRODUCT VERSION<br>○ YES, PRODUCT CONFIGURATION DETAIL | 0 |
| | IS THERE AN ESCALATION PROCESS IN PLACE? | ○ NO, AD HOC<br>○ YES, MULTIPLE APPROVAL AUTHORITIES<br>○ YES, INTEGRATED APPROVAL AUTHORITY | 0 |
| | WHAT PERCENTAGE OF APPLICATIONS REQUIRES EXCEPTIONS? | ○ GREATER THAN 50%<br>○ 10% TO 50%<br>○ LESS THAN 10% | 0 |

PRODUCTION ENVIRONMENT SCORE ............ 0.0  ←46

SGE ASSESSMENT ............ AD HOC  ←58

GUIDANCE...
A WELL-DOCUMENTED PRODUCTION ENVIRONMENT IS ONE OF THE FIRST REQUIREMENTS FOR A QUALITY APPLICATION DESIGN. WHEN THERE IS NO STANDARD ESTABLISHED, DEVELOPMENT TEAMS ARE LEFT TO THEIR OWN DEVICES WHEN SELECTING THEIR DESIRED PRODUCTION ENVIRONMENT. MULTIPLE PROJECTS AND MULTIPLE CONFIGURATIONS DRIVE COMPLEXITY AND COST, MAKING THE JOB OF THE PRODUCTION SUPPORT ORGANIZATION DIFFICULT. THESE FACTORS ESTABLISH ROADBLOCKS TO INTEGRATING APPLICATIONS ACROSS AN ORGANIZATION. DEVELOPMENT TEAMS REQUIRE SUFFICIENT CONFIGURATION DETAIL TO PRODUCE SUCCESSFUL DESIGNS. THE DETAIL LEVEL SHOULD GUIDE SCORING FOR THIS QUESTION. PARTIAL CREDIT FOR STANDARDS THAT DO NOT COVER THE END-TO-END ENVIRONMENT, OR THAT DO NOT PROVIDE DETAILED CONFIGURATION INFORMATION.

OBSERVATIONS:
RECOMMENDATIONS:

*FIG. 14*

METHOD AND SYSTEM FOR ASSESSING A SOFTWARE GENERATION ENVIRONMENT

BACKGROUND OF THE INVENTION

1. Technical Field

The present invention relates to a method and system for assessing a software generation environment.

2. Related Art

Current practice for assessing a software generation environment is inefficient and requires a considerable length of time to generate useful results. Thus, there is a need for a method and system for more efficiently assessing a software generation environment.

SUMMARY OF THE INVENTION

The present invention provides a method for assessing a software generation environment (SGE), said method comprising:
  identifying a plurality of SGE characteristics of the SGE;
  generating at least one query for each SGE characteristic, wherein each query has a plurality of response choices, and wherein each response choice has a numerical score;
  receiving a selected response choice for each query;
  computing and displaying a SGE score for each SGE characteristic, wherein the SGE score for each SGE characteristic is equal to a summation of the numerical scores associated with the selected response choices for the SGE characteristic; and
  computing and displaying a total score, wherein the total score is equal to a summation of the SGE scores.

The present invention provides a system for assessing a software generation environment (SGE):
  receiving means for receiving a selected response choice for each query associated with each SGE characteristic of a plurality of identified SGE characteristics, wherein the plurality of SGE characteristics are comprised by the SGE, wherein each query has a plurality of response choices, and wherein each response choice has an associated numerical score;
  first computing means for computing a SGE score for each SGE characteristic, wherein the SGE score for each SGE characteristic is equal to a summation of the numerical scores associated with the selected response choices for the SGE characteristic;
  second computing means for computing a total score, wherein the total score is equal to a summation of the SGE scores;
  first displaying means for displaying the computed SGE score for each SGE characteristic; and
  second displaying means for displaying the computed total score.

The present invention provides a computer program product, comprising:
  a computer usable medium having a computer readable program code embodied therein for assessing a software generation environment (SGE), wherein the computer readable program code comprises an algorithm adapted to:
  generate at least one query for each SGE characteristic of a plurality of SGE characteristics of the SGE, wherein each query has a plurality of response choices, and wherein each response choice has a numerical score;
  receive a selected response choice for each query;
  compute and display a SGE score for each SGE characteristic, wherein the SGE score for each SGE characteristic is equal to a summation of the numerical scores associated with the selected response choices for the SGE characteristic; and
  compute and display a total score, wherein the total score is equal to a summation of the SGE scores.

The present invention provides a method and system for assessing a software generation environment more efficiently than is accomplished with currently known techniques.

BRIEF DESCRIPTION OF THE DRAWINGS

FIG. 2 provides a list of SGE characteristics, in accordance with embodiments of the present invention.

FIG. 3 provides ratings for ranges of total scores associated with a SGE, in accordance with embodiments of the present invention.

FIGS. 5-11 provide lists of queries associated with the SGE characteristics listed in FIG. 2, in accordance with embodiments of the present invention.

FIGS. 13-14 illustrate panels that may be utilized in a user interactive software environment for implementing a SGE assessment, in accordance with embodiments of the present invention.

DETAILED DESCRIPTION OF THE INVENTION

Software is typically generated in the sequential phases of: design, development, test, and deployment. The software is created in a software generation environment (SGE), and the quality of the SGE affects the efficiency of the software generation process as well as the quality of the generated software. Thus, the quality of the SGE is a measure of the extent to which the SGE enhances: product quality/function, minimization of cycle time, and minimization of cost. Accordingly, the present invention is directed to providing a system and method of assessing the SGE in order to identify the extent to which the SGE is functioning acceptably, and to pinpoint weaknesses in the SGE. Therefore, the present invention facilitates improving the SGE so as to improve the efficiency of the software generation process as well as the quality of the generated software.

Figure 1:
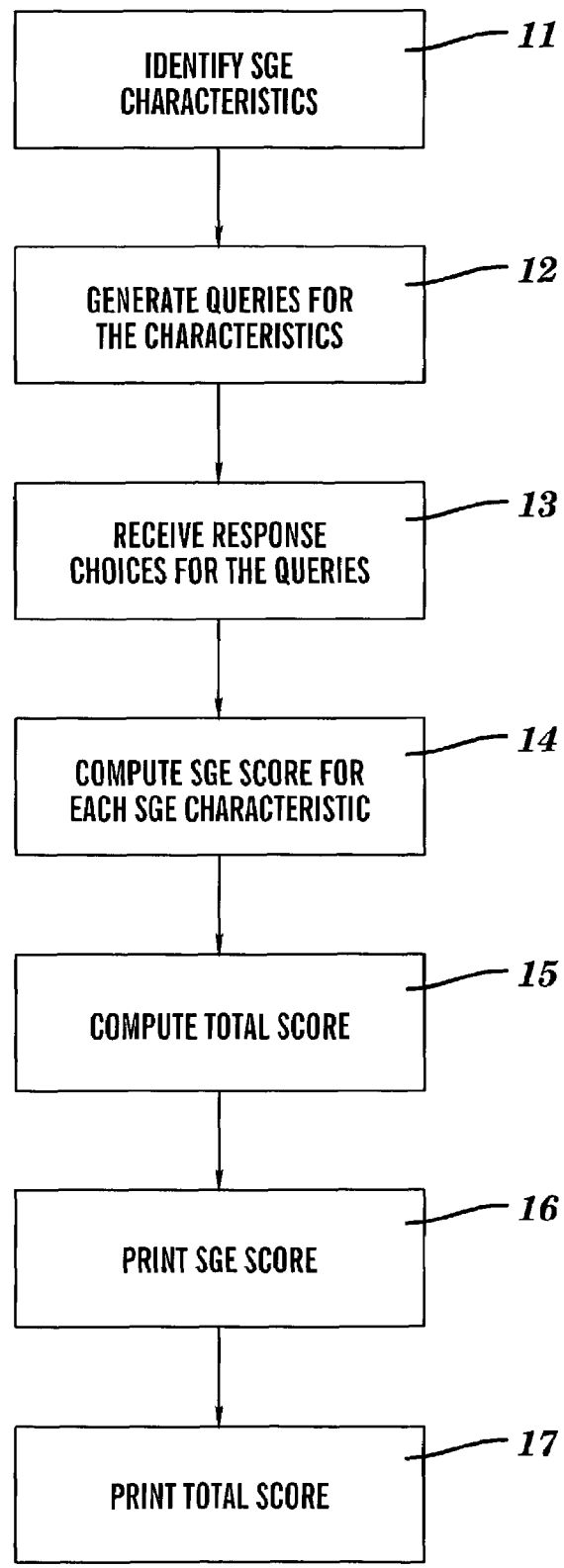
FIG. 1 is a flow chart depicting steps for assessing a software generation environment (SGE), in accordance with embodiments of the present invention.

FIG. 1 is a flow chart depicting steps 11-17 for assessing a software generation environment. Step 11 identifies a plurality of SGE characteristics of the software generation environment. The SGE characteristics may be sufficiently general so as to be applicable to essentially all software generation environments. Alternatively, the SGE characteristics may be tailored to a particular software generation environment or to a specialized group of software generation environments. The identification may be made by any party having sufficient knowledge and/or expertise concerning applicable software generation environments. Each SGE characteristic may be assessed independently of other SGE characteristics.

Step 12 generates at least one query for each SGE characteristic. Each such query has a plurality of response choices, and each response choice has an associated numerical score. The response choices may have any format capable of being objectively scored as would be known to one of ordinary skill in the art. An applicable response choice format is a standard multiple choice format. Another applicable response choice format is a numerical value to be provided as the response choice. For example, the query may ask for the number of computer programmers working in the software generation environment. An additional applicable response choice format is an ordering of objects as the response choice. For example, the query may ask for ordering the time sequence of certain events that occur in the software generation process. The numerical score associated with each response choice may be any real number (e.g., zero; a positive or negative integer, a rational number, an irrational number, etc.).

Step 13 receives a selected response choice, such as from a user, for each query. The selected response choices may be received by any means known to one of ordinary skill in the art as being capable of processing said response choices. For example, the selected response choices may be received by a computer code having an algorithm for assessing the SGE. The selections may be made by one or more individuals. For example, a single individual may select a response choice for all of the queries. As another example, a first individual may select response choices for some of the queries, and a second individual may select response choices for the remaining queries. The basis for making response choices is any reasonable basis such as, inter alia, knowledge of the SGE by said one or more individuals, existing documentation concerning aspects of the SGE, stored data concerning aspects of the SGE, etc. The medium for making response choices comprises any applicable medium known to one of ordinary skill in the art (e.g., an interactive computer panel such described infra in conjunction with FIG. 14, a written questionnaire, an oral questionnaire, etc.).

Step 14 computes a SGE score for each SGE characteristic. The SGE score for each SGE characteristic is equal to a summation of the numerical scores associated with the selected response choices for the queries relating to the SGE characteristic. Said summation may be calculated or determined by any means known to one of ordinary skill in the art such as by said computer code having an algorithm for assessing the SGE.

Step 15 computes a total score. The total score is equal to a summation of the numerical scores associated with the selected response choices of all of the queries relating to all of the SGE characteristics. Said total score may be calculated by any means known to one of ordinary skill in the art such as by said computer code having an algorithm for assessing the SGE.

Step 16 displays the computed SGE score for each SGE characteristic, in any manner known to one of ordinary skill in the art (e.g., as a written summary of SGE scores, as a graphical comparison of SGE scores, etc.). Said computed SGE scores may be displayed by any means known to one of ordinary skill in the art such as by said computer code having an algorithm for assessing the SGE.

Step 17 displays the total score in any manner known to one of ordinary skill in the art. Said total score may be displayed by any means known to one of ordinary skill in the art such as by said computer code having an algorithm for assessing the SGE.

Although FIG. 1 shows steps 11-17 in a particular sequential order, steps 11-17 may be executed in any order that would be apparent to one of ordinary skill in the art. For example, step 16 may be executed prior to step 15.

The method of FIG. 1 may be automated by use of computer software. For example, the SGE queries may be presented for response in computer panels in a computer software product that generates said panels, wherein responses may be obtained by any known method such as by making or selecting response choices with a mouse, with a keyboard, by voice (i.e., using voice recognition software), etc.

FIGS. 2-14 illustrate embodiments of the present invention for a representative SGE. FIG. 2 provides a list of SGE characteristics, a point range of the SGE score for each SGE characteristic, and ratings for ranges of SGE scores. The SGE characteristics in FIG. 2 are illustrative of SGE characteristics that may be employed with the present invention. Generally, the present invention may utilize some, none, all, or all of the SGE characteristics in FIG. 2 as well as any other SGE characteristics not listed in FIG. 2.

Note from FIG. 2 that a first group of SGE characteristics have positive point ranges to emphasize the positivity of the SGE characteristics in the first group, while a second group of SGE characteristics have negative point ranges to emphasize the negativity of the SGE characteristics in the second group. It should be understood that the point ranges in FIG. 2 are illustrative, and any other alternative point ranges may be assigned to the SGE characteristics. FIG. 3 provides ratings for ranges of total scores. It follows from the point ranges of the SGE scores listed in FIG. 2 that the total score is in the range of −30 to 100.

Figure 4:
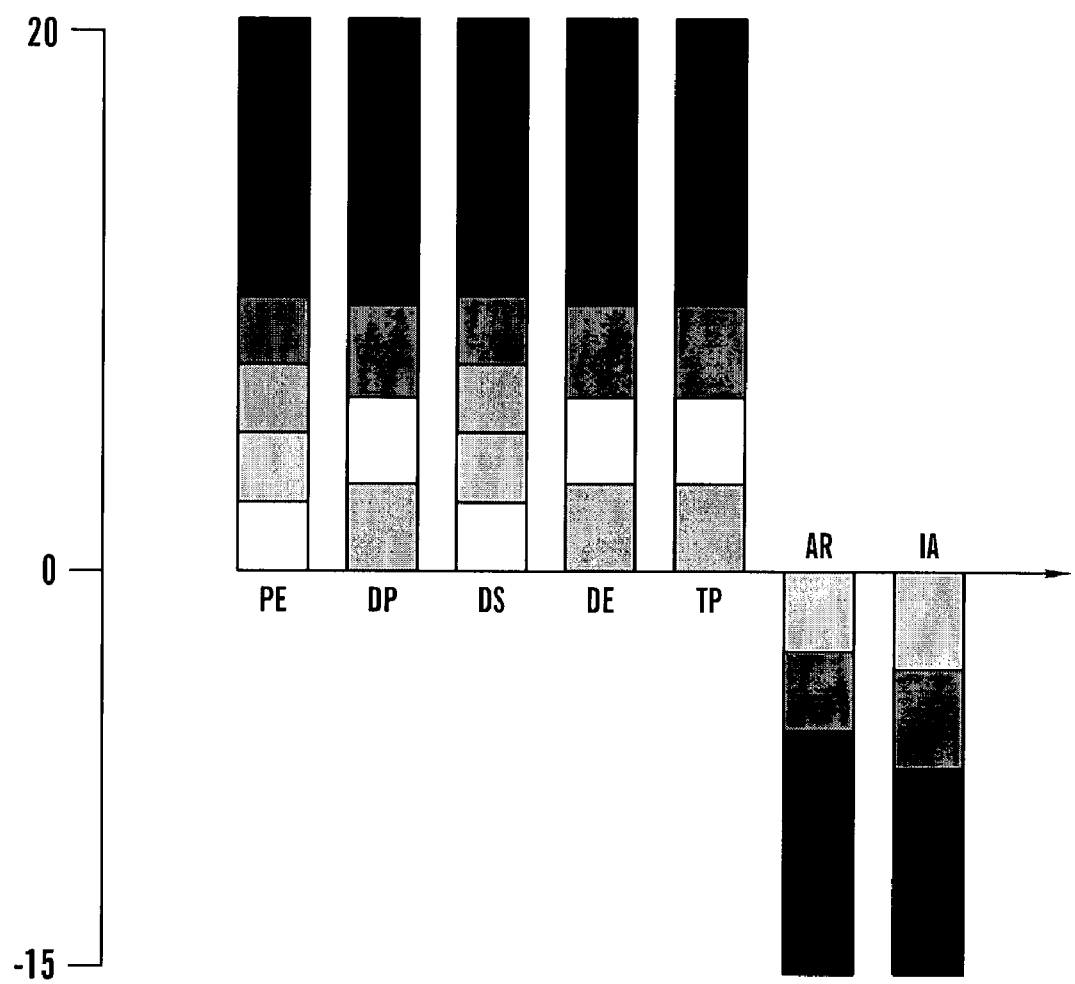
FIG. 4 illustrates a graphical representation of the SGE scores for the SGE characteristics listed in FIG. 2, in accordance with embodiments of the present invention.

FIG. 4 illustrates a graphical representation, namely a bar chart, of the SGE scores for the SGE characteristics listed in FIG. 2. FIG. 4 depicts the SGE scores in the upward direction for those SGE characteristics having positive scores, and which depicts the SGE scores in the downward direction for those SGE characteristics having negative scores. FIG. 4 shows that different ranges of SGE scores may be represented in different shades of gray, or alternatively in different colors. Note that the bar chart representation of the SGE scores in FIG. 4 is illustrative and any other graphical form of representation or a non-graphical form of representation (e.g., a table) is within the scope of the present invention.

FIGS. 5-11 provide lists of queries associated with the SGE characteristics listed in FIG. 2. The SGE characteristics listed in FIG. 2 and associated queries in FIGS. 5-11, are as follows:

| | |
|---|---|
| Production Environment Architecture | (queries in FIG. 5); |
| Deployment Process | (queries in FIG. 6); |
| Development Standards | (queries in FIG. 7); |
| Development Environment | (queries in FIG. 8); |
| Test Process | (queries in FIG. 9); |
| Asset Reuse | (queries in FIG. 10); and |
| Integration and Automation | (queries in FIG. 11). |

The following description of FIGS. 5-11 indicates the response choices for each query, the scores associated with the response choices, and a discussion of the queries and response choices.

Production Environment Architecture (see FIG. 5)

1. Is there a standard production environment in place?
   Response Choices:

| | |
|---|---|
| No | (0 points) |
| Partial | (1 point) |
| Yes | (2.5 points) |

Discussion: A well-documented production environment is one of the first requirements for a quality application design. When there is no standard established, development teams are left to their own devices when selecting their desired production environment. Multiple products and multiple configurations drive complexity and cost, making the job of the production support organization difficult. These factors establish roadblocks to integrating applications across an organization. Development teams require sufficient configuration detail to produce successful designs. The detail level should guide scoring for this question. Partial credit for standards that do not cover the end-to-end environment (i.e., the integrated environment of all interacting applications), or that do not provide detailed configuration information. An example of when a standard production environment is not in place is where some applications run on Windows, while other run on Unix, and yet others run on Linux.

2. Who defines the production environment?
    Response Choices:

| | |
|---|---|
| Individual applications | (0 points) |
| Customer/End User organizations | (1 point) |
| Chief Information Officer/Chief Technical Officer (CIO/CTO) strategy | (2.5 pts.) |

Discussion: Lack of a central authority promotes multiple standards serving conflicting requirements. Scoring for this question should be based on the level within the organization where the production environment is defined, the higher the better. An example of a high score would be where a central group defines the production environment. A central control is more likely to result in a consistent, well-managed, cost effective, and resource effective environment for the entire organization. If every customer defines the environment he or she want to run in, based on his or her own desires and needs, then multiple different environments are created. Such multiple environments are very difficult to maintain, because such multiple environments require having people who know about all these different environments. It leads to problems in making changes, because different systems will have different impacts. If there is a central authority defining the production environment for the company, it allows all architects and customers and developers to know what to expect. The CIO/CTO strategy choice emphasizes that the production environment standards should be reviewed and approved by an executive who has a "view" of the entire enterprise, and has the authority to mandate compliance.

3. Are the production environment standards documented?
    Response Choices:

| | |
|---|---|
| No | (0 points) |
| Yes, out of date | (1 point) |
| Yes, current | (2.5 points) |

Discussion: A well-documented production environment is one of the first requirements for a quality application design. Without documented standards, development teams are forced to make design decisions that will effect the production environment. Clear standards that provide the required detail are critical. Scoring for this question may be based on the clarity, and currency of these standards. In addition, the standards may be written in a way that avoids the need to interpret or make assumptions.

4. How is production environment change managed?
    Response Choices:

| | |
|---|---|
| Ad Hoc, no change control | (0 points) |
| Manual change control | (1 point) |
| Automated change control | (2.5 points) |

Discussion: Changes to the production environment should be managed in a manner that give all stakeholders sufficient time to absorb the change in their own plan without negative impact on cost or schedule. If change is only done on an emergency basis, then the organization tends to become reactive. The absence of a formal change process indicates an organization that is out of control. Manual processes work but are labor intensive. Automated change management, automatic approval, and automatic notification make better use of all stakeholder resources. Scoring for this question should be based on the level of documented change control.

5. How often do unscheduled changes occur in the production environment?
    Response Choices:

| | |
|---|---|
| Weekly | (0 points) |
| Monthly | (1 point) |
| Quarterly | (1.5 points) |
| Yearly | (2.0 points) |
| Never | (2.5 points) |

Discussion: A well-managed production environment adapts to changing business and technical conditions. If the environment is well defined and effectively managed, then there should be very little reason for unscheduled change. Thus the changes should be planned and published far enough in advance to minimize cost or schedule impact on all stakeholders. Frequency of unscheduled change indicates an organization that is out of control. Scoring for this question is based on this frequency.

6. Is an upgrade "roadmap" documented?
    Response Choices:

| | |
|---|---|
| No | (0 points) |
| Yes, product names | (1 point) |
| Yes, product version | (1.5 points) |
| Yes, product configuration detail | (2.5 points) |

Discussion: The Production Upgrade Roadmap documents the changes planned for the production environment. The changes are typically organized by quarter, and the roadmap may provide a minimum time projection (e.g., 18 months). This may be a rolling time projection with product configuration detail level published for the next N quarters (e.g., the next two quarters). It is desirable for a development team get the information required to produce a detail, or micro design based on the roadmap. Scoring for this question is based on the level of detail provided. As an example, consider a developer building an application for a customer that will take a year to develop. Although the developer knows what the production environment looks like today, the developer needs to know what the production environment will look like when the applications completed. This knowledge might have a significant impact on the design of an application 7. Is there an escalation process in place?
   Response Choices:

| | |
|---|---|
| No, Ad Hoc | (0 points) |
| Yes, multiple approval authorities | (1 point) |
| Yes, integrated approval authority | (2.5 points) |

Discussion: "Escalation" means conflict resolution. No single architecture will cover all current and future requirements. Inevitably, conflicts will occur between the production environment architecture and the needs of one of more stakeholders. The identification of clear roles and decision-making authority is critical to support the resolution of these conflicts. There should be a well-established and published management chain for resolving conflict. Scoring for this question is based on the documentation, executive support, and stakeholder "buy in" of this escalation process.

8. What percentage of applications requires exceptions?
   Response Choices:

| | |
|---|---|
| Greater than 50% | (0 points) |
| 10%-50% | (1 point) |
| Less than 10% | (2.5 points) |

Discussion: A robust production environment architecture will support the business and technology requirements of an organization. The frequency of approved exceptions to the published standard is an indication of the architecture's overall quality and suitability. If a small number of applications deviate from established standards, then there is confidence that the production architecture and the standards take into account the needs of the business and the needs of the developers. If a high percentage of applications cannot use the standard (e.g., the applications have requirements not addressed by the standards), then there is a problem with the standards. Scoring for this question is based on the frequency of exception approval, wherein a lower frequency merits a higher score. An example of an exception is having an operating system version 5.3.1 as the standard across the entire organization. However, an application being developed has a problem running in version 5.3.1, so that the application is instead developed to run in version 5.5 in order to be deployed. Hence there is an exception to the standard of having all applications run under version 5.3.1. Thus, if applications have requirements that cannot be solved by a current standard, and thus require exceptions, it calls into question the viability or the acceptability of the standard itself.

Deployment Process (see FIG. 6)

1. Is there a standard deployment process in place?
   Response Choices:

| | |
|---|---|
| No, Ad Hoc | (0 points) |
| Partial | (1 point) |
| No | (3.3 points) |

Discussion: To define "deployment process", consider an application developer and test team as having completed their work, and the next step is to pass the application to the group that will actually install it and run it for the customer. The process by which the application is installed and available to run is called the "deployment process." A formal, well-documented deployment process is a critical component in a healthy application environment. When there is no standard established, and no formal standards compliance assessment performed, configuration and performance issues often result. Identifying these problems when the application is in production is costly and time-consuming. These factors establish roadblocks to integrating applications across an organization. Development teams require sufficient configuration detail to produce successful designs. A well-documented process for the Development Team to follow, and a compliance review by an independent review team, is a way to ensure that this does not happen. The detail level should guide scoring for this question. Partial credit may be given for standards that do not cover the end-to-end environment, and for informal reviews.

2. Who manages the deployment process?
   Response Choices:

| | |
|---|---|
| Development Team | (0 points) |
| Production Support Team | (1 point) |
| Dedicated Deployment Team | (3.3 points) |

Discussion: Lack of a central authority promotes multiple standards serving conflicting requirements. If the deployment process is managed by the team that does the application building (i.e., the developers and programmers), then the application builders are going to define the deployment process in such a way that is easiest for the application, which is not necessarily be the best way for the organization. Similarly, a team that's typically involved in production support (e.g., computer operators) will define the deployment process in reflection of the team's bias. Thus it may be desirable to have a dedicated deployment team that does nothing but install and verify applications. The deployment team sets the deployment standards for both operations and developers. The deployment team has a view of what is best for the organization as a whole in setting up those standards. Scoring for this question should be based on the level within the organization where the deployment process is defined, and the ability of the review team to enforce the process.

3. Is the deployment process documented?
   Response Choices:

| | |
|---|---|
| No | (0 points) |
| Yes, Out of Date | (1 point) |
| Yes, Current | (3.3 points) |

Discussion: A well-documented deployment process is important. Without documented standards and formal compliance reviews, configuration and performance issues arise that are difficult to correct in production. Clear standards that provide the required detail are critical, as well as identifying issues that are required from those that are suggested guidelines. Scoring for this question may be based on the clarity, and currency of these standards. In addition, the standards may be written in a way that avoids the need to interpret or make assumptions.

4. How is change managed within the deployment process?
   Response Choices:

|  |  |
|---|---|
| Ad Hoc, No Change Control | (0 points) |
| Manual Change Control | (1 point) |
| Automated Change Control | (3.3 points) |

Discussion: Changes to the deployment process should be managed in a manner that give all stakeholders sufficient time to absorb the change in their own plan without negative impact on cost or schedule. The absence of a formal change process indicates an organization that is out of control. Manual processes work but are labor intensive. Automated change management, automated approval, and automated notification make better use of all stakeholder resources. Scoring for this question should be based on the level of documented change control.

5. Is there an escalation process in place?
   Response Choices:

|  |  |
|---|---|
| No, Ad Hoc | (0 points) |
| Yes, multiple approval authorities | (1 point) |
| Yes, integrated approval authority | (3.3 points) |

Discussion: No single process will cover all current and future requirements. Inevitably, conflicts will occur between the deployment process and the needs of one of more stakeholders. The identification of clear roles and decision-making authority is critical to support the resolution of these issues. Scoring for this question is based on the documentation, executive support and stakeholder "buy in" of this process.

6. What percent of applications require exceptions?
   Response Choices:

|  |  |
|---|---|
| Greater than 50% | (0 points) |
| 10%-50% | (1 point) |
| Less than 10% | (3.3 points) |

Discussion: A robust deployment process will support the business and technology requirements of an organization. The frequency of approved exceptions to the published standard is an indication of the process's overall quality and suitability. Scoring for this question is based on the frequency of exception approval, wherein a lower frequency merits a higher score. Particular attention should be given to exceptions that are driven by an attempt to avoid or shortcut the deployment process.

Development Standards (see FIG. 7)

1. Is there a standard development process in place?
   Response Choices:

|  |  |
|---|---|
| No | (0 points) |
| Partial | (1 point) |
| Yes | (2.5 points) |

Discussion: Well-documented development standards are one of the first requirements for a quality application design. When there is no standard established, development teams are left to their own devices when selecting their desired technology and the implementation or configuration of the technology. Multiple products and multiple configurations drive complexity and cost, making the job of the production support organization difficult. These factors establish roadblocks to integrating applications across an organization. Development teams require sufficient configuration detail to produce successful designs. The detail level should guide scoring for this question. Partial credit may be given for standards that do not cover the end-to-end environment, or that do not provide detailed configuration information.

2. Who defines the development standards?
   Response Choices:

|  |  |
|---|---|
| Individual applications | (0 points) |
| Customer/End User organizations | (1 point) |
| Chief Information Officer/Chief Technical Officer (CIO/CTO) strategy | (2.5 pts.) |

Discussion: Lack of a central authority promotes multiple standards serving conflicting requirements. Scoring for this question may be based on the level within the organization where the production environment is defined, wherein level within the organization merits a higher score. The CIO/CTO strategy choice emphasizes that the development standards should be reviewed and approved by an executive who has a "view" of the entire enterprise, and has the authority to mandate compliance.

3. Are the Development Standards documented?
   Response Choices:

|  |  |
|---|---|
| No | (0 points) |
| Yes, out of date | (1 point) |
| Yes, current | (2.5 points) |

Discussion: Well-documented development standards are one of the first requirements for a quality application design. Without documented standards, development teams are forced to make design decisions that will effect the production environment. Clear standards that provide the required detail are critical. Scoring for this question may be based on the clarity, and currency of these standards. In addition, the standards may be written in a way that avoids the need to interpret or make assumptions.

4. How is development standards change managed?

Response Choices:

| | |
|---|---|
| Ad Hoc, No Change Control | (0 points) |
| Manual Change Control | (1 point) |
| Automated Change Control | (2.5 points) |

Discussion: Changes to the development standards should be managed in a manner that give all stakeholders sufficient time to absorb the change in their own plan without negative impact on cost or schedule. The absence of a formal change process indicates an organization that is out of control. Manual processes work but are labor intensive. Automated change management, automated approval, and automated notification make better use of all stakeholder resources. Scoring for this question may be based on the level of documented change control.

5. How often do changes occur in the development standards?

Response Choices:

| | |
|---|---|
| Weekly or less | (0 points) |
| Monthly | (1 point) |
| Quarterly | (1.5 point) |
| Yearly | (2.5 points) |

Discussion: Well-managed development standards adapt to changing business and technical conditions. These changes should be planned and published far enough in advance to minimize cost or schedule impact on all stakeholders. Development standards that change too frequently may cause rework (e.g., reprogramming and retesting) that would otherwise not occur. The changes in development standards may ripple through the entire organization. Thus, it is desirable to have good standards and processes in place, and to keep them current in a stable fashion. Frequency of unscheduled change can indicate an organization that is out of control. Scoring for this question is based on this frequency.

6. Are formal architecture reviews required?

Response Choices:

| | |
|---|---|
| No | (0 points) |
| Yes, Standards Compliance Only | (1 point) |
| Yes, Formal Architecture Review | (2.0 points) |
| Yes, Formal End-to-End Architecture/Code Reviews | (2.5 points) |

Discussion: An architectural review is a review of whether a design is in compliance with the standards. The architectural review may be the first step of the development phase. End-to-End Architecture takes into account not only whether a single application meets the standards, but also whether all interacting applications (and the interfaces between the interacting applications) meet the standards. Application design performed in a vacuum is problematic. Opportunity to instill best practices and avoid known difficulties is best done early in the development life cycle where changes are less costly to correct. Scoring for this question may be based on the completeness or scope of the review process.

7. Is there an escalation process in place?

Response Choices:

| | |
|---|---|
| No, Ad Hoc | (0 points) |
| Yes, multiple approval authorities | (1 point) |
| Yes, integrated approval authority | (2.5 points) |

Discussion: No single process will cover all current and future requirements. Inevitably, conflicts will occur between the development standards and the needs of one of more stakeholders. The identification of clear roles and decision-making authority is critical to support the resolution of these issues. Scoring for this question is based on the documentation, executive support, and stakeholder "buy in" of this process.

8. What percent of applications require exceptions?

Response Choices:

| | |
|---|---|
| Greater than 50% | (0 points) |
| 10%-50% | (1 point) |
| Less than 10% | (2.5 points) |

Discussion: Robust development standards will support the business and technology requirements of an organization. The frequency of approved exceptions to the published standard is an indication of the process's overall quality and suitability. Scoring for this question is based on the frequency of exception approval, wherein a lower frequency merits a higher score. Particular attention may be given to exceptions that are driven by an attempt to avoid or shortcut the development standards.

Development Environment (see FIG. 8)

1. Is there a standard development environment in place?

Response Choices:

| | |
|---|---|
| No | (0 points) |
| Partial | (1 point) |
| Yes | (3.3 points) |

Discussion: A dedicated, well-supported development environment, managed by an independent support team enables an organization to produce applications that will deploy cleanly and run well in production. As production environments become increasingly more complex, it becomes extremely difficult for individual development teams to construct environments that match the intended production environment. A central, well-managed environment not only controls cost, but also significantly reduces errors. The detail level should guide scoring for this question. Partial credits may be given for development environments that do not cover the end-to-end production environment.

2. Does the development environment "mirror" the production environment?

Response Choices:

| | |
|---|---|
| No Formal Development Environment, Development Team Responsibility | (0 points) |
| Partial Formal Development Environment, Development Team Responsibility | (1 point) |

-continued

| | |
|---|---|
| Partial Formal Development Environment, Independent Environment Support Team | (2.0 points) |
| Formal End-to-End Development Environment, Independent Environment Support Team | (3.3 points) |

Discussion: It has becomes difficult, if not impossible for individual development teams to construct environments that truly duplicate, or "mirror" production. In place, this type of environment eliminates the possibility of errors introduced by configuration differences between development and production. Properly managed, it also reduces the time required for each development project to acquire or construct local environments. Scoring for this question may be based on coverage, or completeness.

3. How is the development environment managed?
   Response Choices:

| | |
|---|---|
| Ad Hoc, No Change Control | (0 points) |
| Manual Change Control | (1 point) |
| Automated Change Control | (3.3 points) |

Discussion: Changes to the development environment should be managed in a manner that give all stakeholders sufficient time to absorb the change in their own plan without negative impact on cost or schedule. The absence of a formal change process indicates an organization that is out of control. Manual processes work but are labor intensive. Automated change management, automated approval, and automated notification make better use of all stakeholder resources. Scoring for this question may be based on the level of documented change control.

4. Is there a development environment to support the production upgrade "roadmap"?
   Response Choices:

| | |
|---|---|
| No, Ad Hoc, Managed by the Development Team | (0 points) |
| Yes, Ad Hoc, Managed by the Development Team | (1 point) |
| Partial Formal Development Environment, Independent Environment Support Team | (2.0 points) |
| Formal End-to-End Development Environment, Independent Environment Support Team | (3.3 points) |

Discussion: This question addresses the importance of having the development environment change in response to changes in the production environment. For example, if the development environment uses Windows 2000 and the production environment has transitioned from Windows 2000 to Windows XP, then the development environment should likewise transition to Windows XP as soon as possible. The importance of a formal Production Upgrade Roadmap (i.e., upcoming changes) is discussed supra (e.g., query 6 relating to Production Environment Architecture). Development projects, especially those with a long design phase or build phase often require early access to technology. A development team needs to get the information required to produce a detail, or micro design based on the roadmap, and a development environment should be available to the development team to support this work. Scoring for this question is based on the level of detail provided.

5. Is there an escalation process in place?
   Response Choices:

| | |
|---|---|
| No, Ad Hoc | (0 points) |
| Yes, multiple approval authorities | (1 point) |
| Yes, integrated approval authority | (3.3 points) |

Discussion: No single process will cover all current and future requirements. Inevitably, conflicts will occur between the development environment process and the needs of one of more stakeholders. The identification of clear roles and decision-making authority is critical to support the resolution of these issues. Scoring for this question is based on the documentation, executive support, and stakeholder "buy in" of this process.

6. What percent of applications require exceptions?
   Response Choices:

| | |
|---|---|
| Greater than 50% | (0 points) |
| 10%-50% | (1 point) |
| Less than 10% | (3.3 points) |

Discussion: A well-managed development environment will support the business and technology requirements of an organization. The frequency of approved exceptions to the published standard is an indication of the process's overall quality and suitability. Scoring for this question is based on the frequency of exception approval, wherein a lower frequency merits a higher score. Particular attention may be given to exceptions that are driven by an attempt to avoid or shortcut the development environment standards.

Test Process (see FIG. 9)

1. Is there a dedicated test environment in place?
   Response Choices:

| | |
|---|---|
| No | (0 points) |
| Partial | (1 point) |
| Yes | (3.3 points) |

Discussion: A dedicated, well-supported test environment, managed by an independent support team enables an organization to produce applications that will deploy cleanly and run well in production. As production environments become increasingly more complex, it becomes extremely difficult for individual development teams to construct environments that match the intended production environment. A central, well-managed test environment not only controls cost, but also significantly reduces errors that are costly to correct in production. The detail level should guide scoring for this question. Partial credit may be given for test environments that do not cover the end-to-end production environment.

2. Does the test environment "mirror" the production environment?

Response Choices:

| | |
|---|---|
| No Formal Test Environment, Development Team Responsibility | (0 points) |
| Partial Formal Test Environment, Development Team Responsibility | (1 point) |
| Partial Formal Test Environment, Independent Support/Test Team | (2.0 points) |
| Formal End-to-End Test Environment, Independent Support/Test Team | (3.3 points) |

Discussion: It has becomes difficult, if not impossible, for individual development teams to construct environments that truly duplicate, or "mirror" production. Complexity and cost increase when the requirements of effective testing are added to the equation. In place, this type of environment eliminates the possibility of errors introduced by configuration differences between development and production. Properly managed, it also reduces the time required for each development project to acquire or construct local environments. Scoring for this question may be based on coverage, or completeness.

3. How is the test environment managed?

Response Choices:

| | |
|---|---|
| Ad Hoc | (0 points) |
| Manual Test Process | (1 point) |
| Automated Test Process | (3.3 points) |

Discussion: Changes to the test environment should be managed in a manner that give all stakeholders sufficient time to absorb the change in their own plan without negative impact on cost or schedule. The absence of a formal change process indicates an organization that is out of control. Manual processes work but are labor intensive. Automated change management, automated approval, and automated notification make better use of all stakeholder resources. Scoring for this question may be based on the level of documented change control.

4. Is there a test environment to support the production upgrade "roadmap"?

Response Choices:

| | |
|---|---|
| No, Ad Hoc, Managed by the Development Team | (0 points) |
| Yes, Ad Hoc, Managed by the Development Team | (1 point) |
| Partial Formal Development Environment, Independent Environment Support Team | (2.0 points) |
| Formal End-to-End Development Environment, Independent Environment Support Team | (3.3 points) |

Discussion: The importance of a formal Production Upgrade Roadmap is discussed supra (e.g., query 6 relating to Production Environment Architecture). Development projects, especially those with a long design phase or build phase often require early access to technology. A development team needs to get the information required to produce a detail, or micro design based on the roadmap, and there should be a test environment available to the development team to support this work. Scoring for this question is based on the level of detail provided.

5. Is there an escalation process in place?

Response Choices:

| | |
|---|---|
| No, Ad Hoc | (0 points) |
| Yes, multiple approval authorities | (1 point) |
| Yes, integrated approval authority | (3.3 points) |

Discussion: No single process will cover all current and future requirements. Inevitably, conflicts will occur between the test process and the needs of one of more stakeholders. The identification of clear roles and decision-making authority is critical to support the resolution of these issues. Scoring for this question is based on the documentation, executive support, and stakeholder "buy in" of this process.

6. What percent of applications require exceptions?

Response Choices:

| | |
|---|---|
| Greater than 50% | (0 points) |
| 10%-50% | (1 point) |
| Less than 10% | (3.3 points) |

Discussion: A robust test process will support the business and technology requirements of an organization. The frequency of approved exceptions to the published standard is an indication of the process's overall quality and suitability. Scoring for this question is based on the frequency of exception approval, wherein a lower frequency merits a higher score. Particular attention should be given to exceptions that are driven by an attempt to avoid or shortcut the test process. This is an indication of a larger problem in multiple areas.

Asset Reuse (see FIG. 10)

1. Is there an asset reuse policy in place?

Response Choices:

| | |
|---|---|
| None | (−3 points) |
| Ad Hoc, not integrated | (−1 points) |
| Integrated into the business model | (0 points) |

Discussion: An example of asset reuse is a program library of programs that can be reused in a variety of applications. Another example is data that could be reused, such as templates, lists of parts, a telephone directory, etc. Reuse of assets improve the productivity of the organization, since reuse of assets avoids unnecessary duplication of effort. Traditional cost recovery and labor-based business models do not reward asset contribution. Without an organization-wide strategy in place, along with a process to implement the strategy, large scale reuse will stagnate. A bottoms up approaches will result in informal, ad hoc reuse that is limited to pockets within the organization. To be truly effective, asset reuse must be implemented tops down with strong executive support, full business model integration, and effective measurements. Scoring for this question may be based on the scope of the asset reuse policy, business model integration, executive support, and the quality of the measurement system.

2. Are individual assets certified to meet development and production standards?
Response Choices:

| | |
|---|---|
| No | (−3 points) |
| Partial | (−1 points) |
| Yes | (0 points) |

Discussion: Informal reuse produces limited productivity savings. These savings are difficult to measure or quantify. To be truly effective, assets should be "harvested" based on their value. They should be "hardened" to fully support and comply with current development and production standards. They should be "certified" to establish the true value of the asset. Scoring for this question may be based on the type of reuse, informal or integrated, and the level of investment directed to producing reusable assets.

3. Does the asset reuse policy encourage contribution?
Response Choices:

| | |
|---|---|
| No | (−3 points) |
| Somewhat; asset reuse policy not defined or documented | (−1 point) |
| Yes; asset reuse policy measurable, documented | (0 points) |

Discussion: Traditional cost recovery and labor-based business models do not reward asset contribution. Without an organization-wide strategy in place, along with a process to implement the strategy, large scale reuse will stagnate. To encourage contribution, any asset reuse policy should include:
Contributor Incentives that overcome any existing business model roadblocks and tie directly back to the saving produced.
Strong executive support for the program
Enhancements to the business model that support asset value in place of cost recovery.
For example, if asset reuse reduces the need for developers, then developers will not be encouraged to develop reusable assets for fear of being laid off. Scoring for this question may be based on the type of reward in place, with more credit given for actual monetary rewards that scale based on the savings to the organization and are integrated into the business model. Partial credit for standalone and/or non-monetary awards may be based on the type of reuse, informal or integrated, and the level of investment directed to producing reusable assets.

4. Does the asset reuse policy encourage reuse?
Response Choices:

| | |
|---|---|
| No | (−3 points) |
| Somewhat; asset reuse policy not defined or documented | (−1 point) |
| Yes; asset reuse policy measurable, documented | (0 points) |

Discussion: Traditional cost recovery and labor-based business models do not reward asset reuse. Without an organization-wide strategy in place, along with a process to implement the strategy, large scale reuse will stagnate. Employee productivity should not be measured solely on the amount of work produced. To encourage reuse, any asset reuse policy should include:
Reuse Incentives that overcome any existing business model roadblocks and tie directly back to the saving produced.
Strong executive support for the program
Enhancements to the business model that support asset value in place of cost recovery.
For example, if asset reuse reduces the need for developers because it enables the developer to work more efficiently, then developers will not be encouraged to use reusable assets for fear of being laid off. Scoring for this question may be based on the type of reward in place, with more credit given for actual monetary rewards that scale based on the savings to the organization and are integrated into the business model. Partial credit may be given for standalone and/or non-monetary awards.

5. How are reuse-based savings measured?
Response Choices:

| | |
|---|---|
| None | (−3 points) |
| Ad Hoc | (−1 points) |
| Integrated, value-based | (0 points) |

Discussion: Ad hoc measurement of reuse-based savings is not very accurate, because it is based on informal use of assets without an objective basis for valuation of savings. An objective evaluation should take into account the development time, the testing time, and the documentation time for the asset, which will not have to be repeated during reuse. To be effective, the value of assets must be understood. Investment in development, hardening, certification, and maintenance along with the actual effort to reuse and publishing cost must be accurately determined. Measurements that are anecdotal or based on assumptions cannot contribute to the organization's business targets. Scoring may based on the type of measurement in place. Identification of direct productivity and value at the asset level is best. Partial credit may be given for an established measurement system that is assumption-based.

Integration and Automation (see FIG. 1)

1. How are changes between production architecture and development standards managed?
Response Choices:

| | |
|---|---|
| No synchronization | (−3.75 points) |
| Manual synchronization | (−1 points) |
| Automated synchronization | (0 points) |

Discussion: Production architecture and development standards cannot be viewed as separate "islands" in a well-managed, mature environment. Changes in either area must be accommodated in the other in a manner that gives all stakeholders sufficient time to absorb the change in their own plan without negative impact on cost or schedule. Scoring for may be based on the level of synchronization and communication between the production architecture and development standards.

2. How are changes between production, development and test environments managed?

Response Choices:

| | |
|---|---|
| No synchronization | (−3.75 points) |
| Manual synchronization | (−1 points) |
| Automated synchronization | (0 points) |

Discussion: Production, development, and test environments cannot be viewed as separate "islands" in a well-managed, mature environment. Changes in any area must be accommodated in the others in a manner that gives all stakeholders sufficient time to absorb the change in their own plan without negative impact on cost or schedule. Scoring may be based on the level of synchronization, communication, and the detail in upgrade plans between the production, development, and test environments.

3. How is problem reporting managed?

Response Choices:

| | |
|---|---|
| Ad Hoc, no defined process or management system | (−3.75 points) |
| Manual system, individual systems | (−1 points) |
| Automated system covering all environments | (0 points) |

Discussion: One characteristic of a mature, well-managed application environment is the way in which problems are reported, tracked, and corrected. The absence of a formal problem management process indicates an organization that is out of control. Manual processes work but are labor intensive. As an example, automatic change notification should be directed only to those persons affected by the change, which may be implemented by an algorithm that goes through an intelligent process of determining who actually should be notified. Automated problem management and notification make better use of all stakeholder resources. Scoring may be based on the sophistication level of the problem management system.

4. How is system monitoring managed?

Response Choices:

| | |
|---|---|
| Ad Hoc, no defined process or management system | (−3.75 points) |
| Manual system | (−1 points) |
| Automated system | (0 points) |

Discussion: Another characteristic of a mature, well-managed application environment is the way in which the components of the environment are monitored. The absence of a formal problem management process indicates an organization that is out of control. While "heartbeat" checking is a start, monitoring should include early warning notification of components that are nearing an out-of-profile condition. For example, disk storage space should be monitored for percent utilization, so that when available disk storage space becomes dangerously low, corrective action could be taken before the system comes to a halt. Manual processes work but are labor intensive. Automated system monitoring and notification make better use of all stakeholder resources. Scoring for this question may be based on the sophistication level of the monitoring system.

Figure 12:
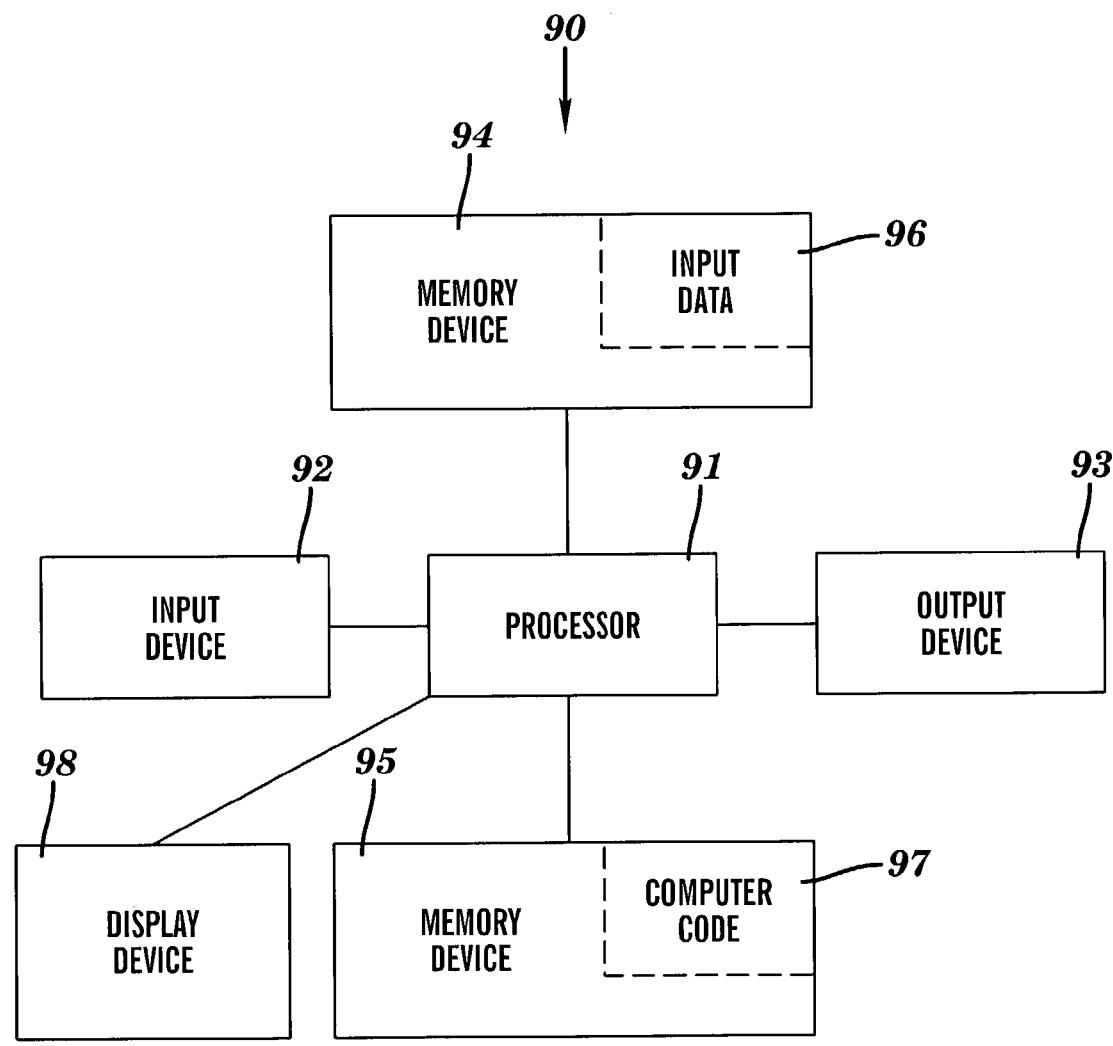
FIG. 12 illustrates a computer system for assessing a SGE, in accordance with embodiments of the present.

Assessing the SGE using the method of FIG. 1, as illustrated in the embodiments of FIGS. 2-11, may be performed in software using a computer system. FIG. 12 illustrates such a computer system, namely computer system 90 for assessing the SGE, in accordance with embodiments of the present invention. The computer system 90 comprises a processor 91, an input device 92 coupled to the processor 91, an output device 93 coupled to the processor 91, memory devices 94 and 95 each coupled to the processor 91, and a display device 98 coupled to the processor 91. The input device 92 may be, inter alia, a keyboard, a mouse, etc. The output device 93 may be, inter alia, a printer, a plotter, a magnetic tape, a removable hard disk, a floppy disk, etc. The output device 93 represents one or more of such devices. The display device 98 (e.g., computer screen) may be used to display panels for implementing the SGE assessment, as will be described infra in conjunction with FIGS. 13-14. The memory devices 94 and 95 may be, inter alia, a hard disk, a dynamic random access memory (DRAM), a read-only memory (ROM), etc. The memory device 95 includes a computer code 97. The computer code 97 includes an algorithm for assessing the SGE. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 12) may be used as a computer usable medium having a computer readable program code embodied therein, wherein the computer readable program code comprises the computer code 97. While FIG. 12 shows the computer system 90 as a particular configuration of hardware and software, any configuration of hardware and software, as would be known to a person of ordinary skill in the art, may be utilized for the purposes stated supra in conjunction with the particular computer system 90 of FIG. 12. For example, the memory devices 94 and 95 may be portions of a single memory device rather than separate memory devices.

Figure 13:
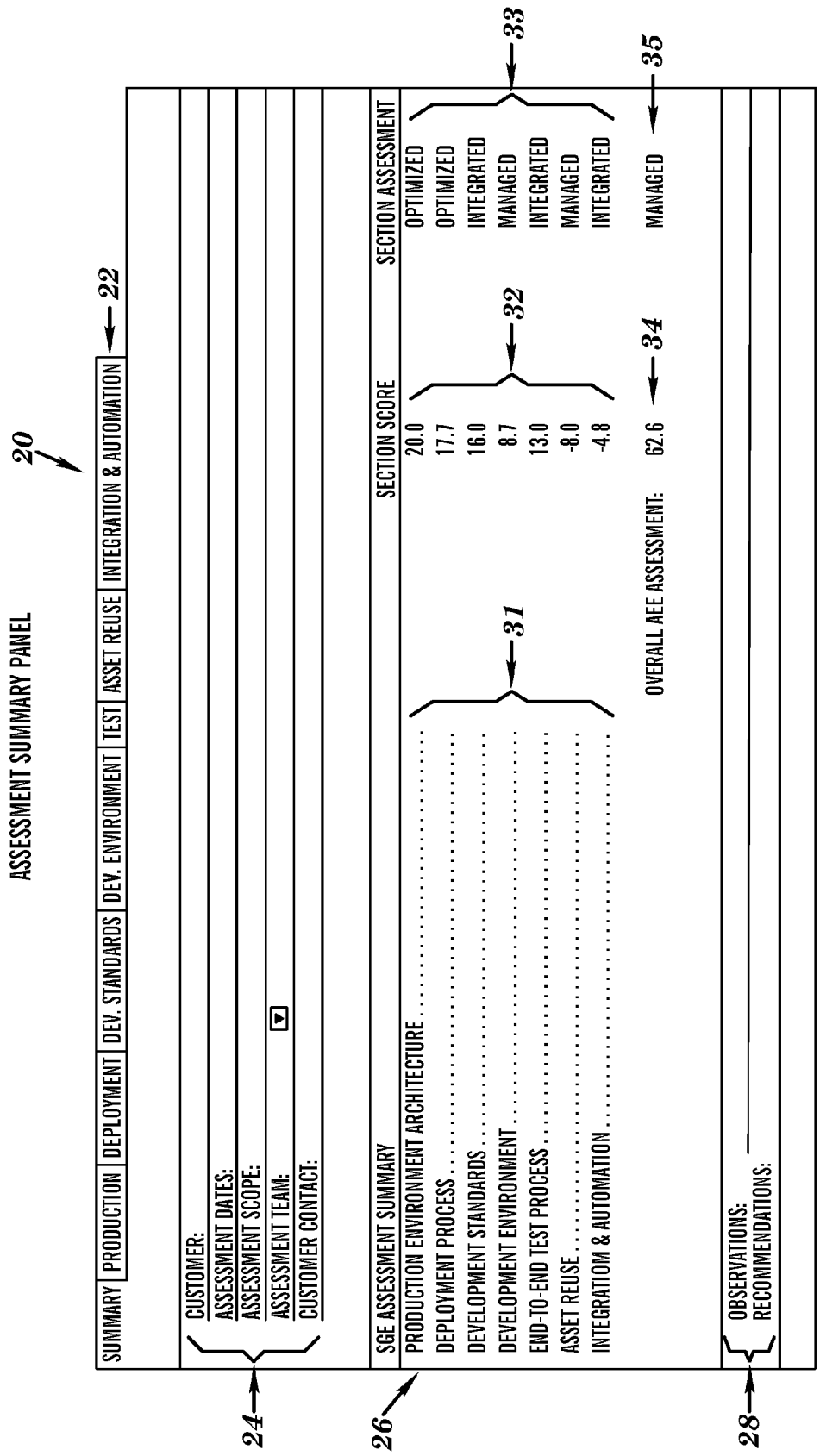

FIGS. 13-14 illustrate panels that may be utilized in a user interactive software environment for implementing a SGE assessment, in accordance with embodiments of the present invention. Said panels may appear on a display device such as the display device 98 shown in FIG. 12.

In FIG. 13, a panel 20 comprises a panel selection bar 22, a customer portion 24, a SGE assessment summary portion 26, and an observation & recommendations portion 28. The panel selection bar 22 enables the user to select a panel for the SGE assessment summary ("Summary") or for any of the seven SGE characteristics listed in FIG. 2 (i.e., "Production", "Deployment", "Dev Standards", "Dev Environment", "Test", "Asset Reuse", "Integration & Automation"). In FIG. 13, the "Summary" panel has been selected. The customer portion 24 has information to be inserted for identifying: the customer whose SGE is being assessed, assessment dates, assessment scope, assessment team, and customer contact. The SGE assessment summary portion 26 lists the SGE characteristics 31 of FIG. 2, the SGE scores 32 resulting from the selected response choices for the queries relating to the SGE characteristics, the rating 33 for each SGE characteristic (i.e., "Section Assessment"), the total score 34, and the rating 35 for the total score. The observation & recommendations portion 28 includes anecdotal text supplied by the user.

If the user has selected the "Production" SGE characteristic from the panel selection bar 22, the panel 40 of FIG. 14 is displayed. FIG. 14, the panel 40 comprises the panel selection bar 22, a query portion 44, a SGE score portion 46, a SGE rating portion 58, a guidance portion 50, and an observation & recommendations portion 52. The panel 40 includes queries 53, response choices 54 for the queries, and query scores 55 for the selected response choices. FIG. 14 clearly indicates that "Production" has been selected from the panel selection bar 22, so that the Production Environment Architecture panel is being displayed. The queries 53 are the queries relating to Production Environment Architecture (see FIG. 5). The response choices 54 (labeled as an "Assessment" column in FIG. 14) lists the response choices for each such query. The query scores 55 are for the selected response choices. The SGE score portion 46 (PRODUCTION ENVIRONMENT SCORE) for the Production Environment Architecture characteristic is a summation over the query scores 55. The SGE rating portion 58 indicates the rating for the SGE characteristic based on the SGE score 46. Note that each query in the query section 44 may be selected by the user. For the query selected, the guidance portion 50 provides guidance for query scores 55 and may include content from the "Discussion" section discussed supra herein for the selected query. The observation & recommendations portion 52 includes anecdotal text supplied by the user.

Although not shown herein, the other SGE panels, namely "Deployment" (i.e., Deployment Process), "Dev Standards" (i.e., Development Standards), "Dev Environment" (i.e., Development Environment), "Test" (i.e., Test Process), "Asset Reuse" (i.e., Asset Reuse), "Integration & Automation" (i.e., Integration and Automation), have a format analogous to the format of the panel 40 of FIG. 14.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A panel display method for use with a display device of a computer system for assessing a software generation environment, said computer system comprising a processor, said method comprising:

said processor displaying a first panel in the display device, wherein the first panel comprises a first panel selection bar, a customer portion, a software generation environment (SGE) assessment summary portion; and a first observation & recommendations portion, wherein the first panel selection bar enables a user to select a first display item from the first panel selection bar for display in a second panel in the display device, wherein the first display item is a SGE assessment summary or a first SGE characteristic of seven SGE characteristics consisting of Production Environment Architecture, Deployment Process, Development Standards, Development Environment, Test Process, Asset Reuse, and Integration & Automation, wherein the first panel selection bar is configured to respond to the user's selection of the first display item to visually identify the first display item selected by the user, wherein the customer portion comprises information to be inserted for identifying a customer whose SGE is being assessed, assessment dates, assessment scope, assessment team, and customer contact, wherein the SGE assessment summary portion lists the seven SGE characteristics, SGE scores for representing summations of individual numerical query scores resulting from selected response choices for queries relating to the seven SGE characteristics, a rating for each SGE characteristic, a total score pertaining to the selected response choices, and a rating for the total score, and wherein the first observation & recommendations portion is configured to include first anecdotal text supplied by the user; and responsive to the user's selection of the first display item, said processor identifying the first display item selected by the user and displaying the second panel in the display device, wherein the second panel comprises a second panel selection bar, a query portion, a SGE score portion, a SGE rating portion, a guidance portion, and a second observation & recommendations portion, wherein the second panel selection bar enables the user to select a second display item from the second panel selection bar for display in the second panel in the display device, wherein the second display item is the SGE assessment summary or a second SGE characteristic of the seven SGE characteristics, and wherein the second panel selection bar is configured to respond to the user's selection of the second display item to visually identify the second display item selected by the user, wherein the query portion comprises queries pertaining to the user's selection of the second SGE characteristic, response choices for each query, and individual numerical query scores for the response choices, wherein the SGE score portion comprises a SGE score consisting of a displayed numerical summation over the query scores for the response choices, wherein the SGE rating portion indicates a rating for the second SGE characteristic based on the SGE score, wherein the guidance portion includes guidance text describing the meaning of each query and the meaning of the response choices for each query for guiding the user to select a response choice for each query, wherein the guidance text is displayed in the guidance portion in response to selection of each query by the user such that the displayed guidance text in the guidance portion is keyed to the selected query, and wherein the second observation & recommendations portion is configured to include second anecdotal text supplied by the user.

2. The panel display method of claim 1, wherein the SGE score for at least two SGE characteristic of the seven SGE characteristics is numerically positive, and wherein the SGE score for at least one SGE characteristic of the seven SGE characteristics is numerically negative.

3. The panel display method of claim 1,
wherein the SGE score for the SGE characteristic of Production Environment Architecture is numerically positive,
wherein the SGE score for the SGE characteristic of Deployment Process is numerically positive,
wherein the SGE score for the SGE characteristic of Development Standards is numerically positive,
wherein the SGE score for the SGE characteristic of Development Environment is numerically positive,
wherein the SGE score for the SGE characteristic of Test Process is numerically positive,
wherein the SGE score for the SGE characteristic of Asset Reuse is numerically negative,
wherein the SGE score for the SGE characteristic of Integration & Automation is numerically negative.

4. A computer system comprising a processor and a computer readable memory unit coupled to the processor, said memory unit containing instructions that when executed by the processor implement a panel display method for use with a display device of the computer system for assessing a software generation environment (SGE), said method comprising:

said processor displaying a first panel in the display device, wherein the first panel comprises a first panel selection bar, a customer portion, a software generation environment (SGE) assessment summary portion; and a first observation & recommendations portion, wherein the first panel selection bar enables a user to select a first display item from the first panel selection bar for display in a second panel in the display device, wherein the first display item is a SGE assessment summary or a first SGE characteristic of seven SGE characteristics consisting of Production Environment Architecture, Deployment Process, Development Standards, Development Environment, Test Process, Asset Reuse, and Integration & Automation, wherein the first panel selection bar is configured to respond to the user's selection of the first display item to visually identify the first display item selected by the user, wherein the customer portion comprises information to be inserted for identifying a customer whose SGE is being assessed, assessment dates, assessment scope, assessment team, and customer contact, wherein the SGE assessment summary portion lists the seven SGE characteristics, SGE scores for representing summations of individual numerical query scores resulting from selected response choices for queries relating to the seven SGE characteristics, a rating for each SGE characteristic, a total score pertaining to the selected response choices, and a rating for the total score, and wherein the first observation & recommendations portion is configured to include first anecdotal text supplied by the user; and responsive to the user's selection of the first display item, said processor identifying the first display item selected by the user and displaying the second panel in the display device, wherein the second panel comprises a second panel selection bar, a query portion, a SGE score portion, a SGE rating portion, a guidance portion, and a second observation & recommendations portion, wherein the second panel selection bar enables the user to select a second display item from the second panel selection bar for display in the second panel in the display device, wherein the second display item is the SGE assessment summary or a second SGE characteristic of the seven SGE characteristics, and wherein the second panel selection bar is configured to respond to the user's selection of the second display item to visually identify the second display item selected by the user, wherein the query portion comprises queries pertaining to the user's selection of the second SGE characteristic, response choices for each query, and individual numerical query scores for the response choices, wherein the SGE score portion comprises a SGE score consisting of a displayed numerical summation over the query scores for the response choices, wherein the SGE rating portion indicates a rating for the second SGE characteristic based on the SGE score, wherein the guidance portion includes guidance text describing the meaning of each query and the meaning of the response choices for each query for guiding the user to select a response choice for each query, wherein the guidance text is displayed in the guidance portion in response to selection of each query by the user such that the displayed guidance text in the guidance portion is keyed to the selected query, and wherein the second observation & recommendations portion is configured to include second anecdotal text supplied by the user.

5. The computer system of claim 4, wherein the SGE score for at least two SGE characteristic of the seven SGE characteristics is numerically positive, and wherein the SGE score for at least one SGE characteristic of the seven SGE characteristics is numerically negative.

6. The computer system of claim 4,
wherein the SGE score for the SGE characteristic of Production Environment Architecture is numerically positive,
wherein the SGE score for the SGE characteristic of Deployment Process is numerically positive,
wherein the SGE score for the SGE characteristic of Development Standards is numerically positive,
wherein the SGE score for the SGE characteristic of Development Environment is numerically positive,
wherein the SGE score for the SGE characteristic of Test Process is numerically positive,
wherein the SGE score for the SGE characteristic of Asset Reuse is numerically negative,
wherein the SGE score for the SGE characteristic of Integration & Automation is numerically negative.

7. A computer program product, comprising a computer readable storage medium having a computer readable program code stored therein, said computer readable program code comprising software that when executed by a processor of a computer system implement a panel display method for use with a display device of the computer system for assessing a software generation environment (SGE), said method comprising:

said processor displaying a first panel in the display device, wherein the first panel comprises a first panel selection bar, a customer portion, a software generation environment (SGE) assessment summary portion; and a first observation & recommendations portion, wherein the first panel selection bar enables a user to select a first display item from the first panel selection bar for display in a second panel in the display device, wherein the first display item is a SGE assessment summary or a first SGE characteristic of seven SGE characteristics consisting of Production Environment Architecture, Deployment Process, Development Standards, Development Environment, Test Process, Asset Reuse, and Integration & Automation, wherein the first panel selection bar is configured to respond to the user's selection of the first display item to visually identify the first display item selected by the user, wherein the customer portion comprises information to be inserted for identifying a customer whose SGE is being assessed, assessment dates, assessment scope, assessment team, and customer contact, wherein the SGE assessment summary portion lists the seven SGE characteristics, SGE scores for representing summations of individual numerical query scores resulting from selected response choices for queries relating to the seven SGE characteristics, a rating for each SGE characteristic, a total score pertaining to the selected response choices, and a rating for the total score, and wherein the first observation & recommendations portion is configured to include first anecdotal text supplied by the user; and responsive to the user's selection of the first display item, said processor identifying the first display item selected by the user and displaying the second panel in the display device, wherein the second panel comprises a second panel selection bar, a query portion, a SGE score portion, a SGE rating portion, a guidance portion, and a second observation & recommendations portion, wherein the second panel selection bar enables the user to select a second display item from the second panel selection bar for display in the second panel in the display device, wherein the second display item is the SGE assessment summary or a second SGE characteristic of the seven SGE characteristics, and wherein the second panel selection bar is configured to respond to the user's selection of the second display item to visually identify the second display item selected by the user, wherein the query portion comprises queries pertaining to the user's selection of the second SGE characteristic, response choices for each query, and individual numerical query scores for the response choices, wherein the SGE score portion comprises a SGE score consisting of a displayed numerical summation over the query scores for the response choices, wherein the SGE rating portion indicates a rating for the second SGE characteristic based on the SGE score, wherein the guidance portion includes guidance text describing the meaning of each query and the meaning of the response choices for each query for guiding the user to select a response choice for each query, wherein the guidance text is displayed in the guidance portion in response to selection of each query by the user such that the displayed guidance text in the guidance portion is keyed to the selected query, and wherein the second observation & recommendations portion is configured to include second anecdotal text supplied by the user.

8. The computer program product of claim 7, wherein the SGE score for at least two SGE characteristic of the seven SGE characteristics is numerically positive, and wherein the SGE score for at least one SGE characteristic of the seven SGE characteristics is numerically negative.

9. The computer program product of claim 7, wherein the SGE score for the SGE characteristic of Production Environment Architecture is numerically positive, wherein the SGE score for the SGE characteristic of Deployment Process is numerically positive, wherein the SGE score for the SGE characteristic of Development Standards is numerically positive, wherein the SGE score for the SGE characteristic of Development Environment is numerically positive, wherein the SGE score for the SGE characteristic of Test Process is numerically positive, wherein the SGE score for the SGE characteristic of Asset Reuse is numerically negative, wherein the SGE score for the SGE characteristic of Integration & Automation is numerically negative.

\* \* \* \* \*